United States Patent
Sarin

(10) Patent No.: US 10,819,785 B2
(45) Date of Patent: Oct. 27, 2020

(54) NETWORK CACHE OF DEVICE INPUT FOR REDUNDANCY DURING DEVICE INOPERABILITY

(71) Applicant: PAYPAL, INC., San Jose, CA (US)

(72) Inventor: Pankaj Sarin, Elkhorn, NE (US)

(73) Assignee: PAYPAL, INC., San Jose, CA (US)

( * ) Notice: Subject to any disclaimer, the term of this patent is extended or adjusted under 35 U.S.C. 154(b) by 286 days.

(21) Appl. No.: 15/854,592

(22) Filed: Dec. 26, 2017

(65) Prior Publication Data
US 2019/0199793 A1    Jun. 27, 2019

(51) Int. Cl.
| | | |
|---|---|---|
| G06F 15/16 | (2006.01) |
| H04L 29/08 | (2006.01) |
| G06Q 20/38 | (2012.01) |
| H04L 29/06 | (2006.01) |
| G06Q 20/10 | (2012.01) |
| G06Q 20/16 | (2012.01) |
| G06Q 20/36 | (2012.01) |

(52) U.S. Cl.
CPC ....... *H04L 67/1095* (2013.01); *G06Q 20/108* (2013.01); *G06Q 20/16* (2013.01); *G06Q 20/3674* (2013.01); *G06Q 20/389* (2013.01); *H04L 63/0414* (2013.01); *H04L 63/0861* (2013.01); *H04L 63/126* (2013.01); *H04L 67/306* (2013.01); *H04L 63/0492* (2013.01); *H04L 2463/102* (2013.01)

(58) Field of Classification Search
CPC .. G06Q 20/108; G06Q 20/16; G06Q 20/3674; G06Q 20/389; G07F 7/0873; G07F 7/0893; H04L 2463/102; H04L 63/0414; H04L 63/0492; H04L 63/0861; H04L 63/126; H04L 67/1095; H04L 67/306; H04W 4/023
See application file for complete search history.

(56) References Cited

U.S. PATENT DOCUMENTS

| | | | | |
|---|---|---|---|---|
| 2007/0083444 A1* | 4/2007 | Matthews | .......... | G06Q 30/0226 705/30 |
| 2012/0244885 A1* | 9/2012 | Hefetz | .............. | H04M 15/8033 455/456.2 |
| 2017/0330250 A1* | 11/2017 | Arjomand | .............. | G06Q 10/10 |

* cited by examiner

*Primary Examiner* — Normin Abedin
(74) *Attorney, Agent, or Firm* — Haynes and Boone, LLP

(57) ABSTRACT

There are provided systems and methods for a network cache of device input for redundancy during device inoperability. A device may detect that the device is in danger of failure, for example, if a battery is low on the device, the device is damaged, or the device may lose network connectivity. On detection of such a condition, the device may request that a server that performs electronic transaction processing establish or trigger a mode that allows for caching of transaction data as input for the transaction data is entered to a device, which may be done by sending signaling to the server indicating the condition that affects the device's operability. The server may then cache input for the transaction data. If the device fails prior to approving and completing electronic transaction processing, the server may use the cached data to generate a digital ledger for another entity.

17 Claims, 5 Drawing Sheets

NETWORK CACHE OF DEVICE INPUT FOR REDUNDANCY DURING DEVICE INOPERABILITY

TECHNICAL FIELD

The present application generally relates to electronic data storage, and more specifically to using a network cache to complete data processing in the event of device inoperability.

BACKGROUND

Users may utilize various mobile computing devices, such as tablet computers, mobile smart phones, and wearable computing devices, to perform computing functions. For example, users may wish to perform payment processes using mobile devices, which may include electronic transaction processing for purchase with merchants and/or transfers to other users at virtually any location. However, computing devices, and especially mobile devices that utilize batteries and require cellular signaling, may become at risk of failure or lack of network connectivity. For example, heavy use of a mobile device may drain a battery so that the device may fail during electronic transaction processing. Certain locations may also have low or no signal strength, making connectivity with other devices and servers difficult or slow. When such situations occur, the users may be left without device functionality, and thus be prevented of use of their device to continue utilizing processes and applications on the device. Moreover, issues in communicating data with a remote device/server may cause repeated entry of data and use of a process, thereby potentially causing multiple transaction processes.

Figure 1:
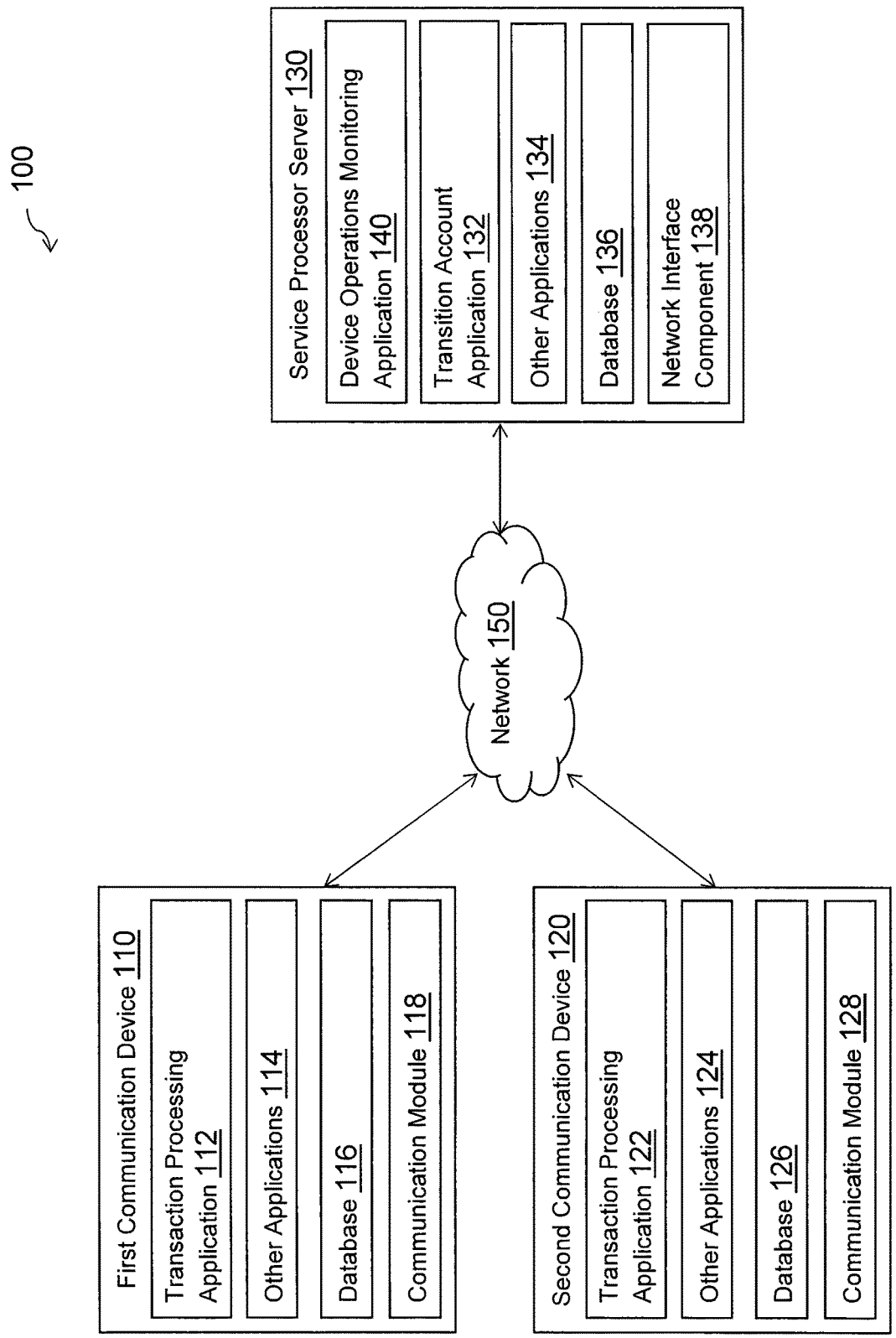
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a network cache of device input for redundancy during device inoperability. Systems suitable for practicing methods of the present disclosure are also provided.

A communication device may be utilized by a user to perform various electronic transaction processing processes, including shopping, purchase, user transfers, and other user or merchant transactions. The communication device may therefore include one or more software processes to perform the aforementioned actions, which may be included with one or more applications executing on the communication device. Such software processes may be utilized through the hardware features of the communication device, such as a hardware processor, device display and other output devices, network access components, input devices, etc. These components may be used to conduct network communications with a server, for example, a service provider or online transaction processor that provides the electronic transaction processing processes. Additionally, the communication device may include additional hardware features that allow execution of the processes, such as a battery or other finite power source, until they become depleted and cause the device to become inoperable. The communication device may include various hardware and software features related to these components.

During use of the communication device, a pending or upcoming condition of inoperability and/or failure of the communication device may be detected. For example, the communication device and/or a service provider may determine the pending, upcoming, future, or predicted conditions, which have yet to happen to the communication device, which may cause failure of the communication device and/or cause the communication device to no longer be capable of network communications with the online service provider. A condition may correspond to a risk level associated with network connectivity loss due to lack of signal strength available at a location and/or power level (e.g., a low power state) of the communication. The condition may correspond to inoperability or failure of the device at some future time. The future time may be imminent (e.g., within the next few seconds or minutes), may be at a specific future time (e.g., a 10 AM local time), or may be within a longer timeframe but prior to the user finishing the current processes the user is utilizing on the device (e.g., failure of the device prior to the user finishing a payment or transfer process with another entity).

The condition affecting operation or causing failure of the communication device may correspond to a hardware and/or software failure. For example, the condition may be one or more of the following: low battery, no communication signal or low communication signal, structural or hardware damage, software damage or corruption (e.g., malware, a virus, etc.), a software update for the communication device that may affect the current application or processes executing on the communication device, a firmware update, a hardware update or replacement, other types of updates that may require the communication device to power off or restart, lack of memory storage to perform and/or complete computing processes, and/or an application corruption of an application executing on the communication device. Other or different conditions may also be detected that may affect use of the communication device and/or failure of the communication device. In various embodiments, the detection of the condition may be performed by a process executing on the communication device, and may be communicated to the service provider or transaction processor, for example, through one or more communication signals that include data of the inoperability condition. However, in further embodiments, a server or other device, such as a service provider's server may instead query the device for data and determine the condition.

On detection of the condition indicating a predicted non-operation or failure of the communication device or loss of communication signaling between the device and the service provider, the communication device and/or service provider server may activate a mode associated with the service provider to provide redundancy for electronic transaction processing by the service provider where the communication device and the server provider are no longer able to communicate. The mode may correspond to a low power mode or transition mode, where the service provider establishes or triggers a state for the device that begins caching data as it is input into an application to store the data in case of device failure or lack of communications with the device. The mode may be activated for an account of the user with the service provider, which may correspond to the account used by the device with the application to perform electronic transaction processing with the service provider. The mode may be established based on the condition of the device, and may be opted-in to by the user with the account, or may be automatically established by the service provider with the account to provide redundancy. Thus, in certain embodiments, the user may also opt-out or turn off the mode so that the mode is not available. The user may also establish certain preferences for use of the option, such as only at specific times or at specific locations.

The service provider may then begin caching data input to an application on the communication device as the data is input to the application for electronic transaction processing, such as a payment to another user or merchant or a data transfer by the user associated with the communication device to the other user. The service provider may cache transaction data and other input, as well as one or more processes currently executing on the communication device, such as those processes with the application used for electronic transaction processing. The process(es) executing on the communication device may correspond to current processes that the user is utilizing, for example, if the user currently has the application open and is processing data, receiving output, and/or providing input to the application, such as transaction data for a transaction. Thus, the process(es) may correspond to one or more applications currently executing on the communication device. Determination of the process(es) may also correspond to the current process or application data, such as the input by the user to the process/application, processed or processing data, communications and network data transfers, and/or application output. For example, if the user is currently in a checkout and payment process with a merchant, the current website/webpage and/or application interface, as well as the transaction and payment data may be determined. The process(es) and process/application data may be stored on the communication device, as well as communicated to the service provider's server for storage in the data cache based on the mode.

Based on the activated mode, the service provider may keep the data in the cache, or other short or long term memory including a non-volatile memory that may more permanently store the data. The data in the cache may be refreshed and new data may be stored in the cache as data is received by the service provider from the communication device. The data may be marked as pending transaction data in the data cache. If the transaction proceeds to completion prior to the device becoming inactive or no longer communicating with the service provider, the service provider may delete the data in the cache for the transaction and may mark the transaction as complete. The service provider may clear the transaction data in the data cache if the service provider completes electronic transaction processing with the device and the device is still active and in communication with the service provider. However, if the service provider determines that the device is no longer active, such as if the device has become inoperable due to battery power or no longer has network connectivity, the service provider may proceed to utilize the data cache to successfully complete electronic transaction processing for the transaction. The device may be detected as inoperable based on a signal sent to the device or received from the device, or may be detected based on a lack of responsive signals to the service provider, for example, if the service provider pings the communication device and does not receive a responsive signal. Thus, if the device is detected as being inoperable or unable to send and receive communication signals, the service provider may mark the pending transaction a pending or transition pending based on the cached data instead of marking the transaction as failed. The service provider may not delete the transaction and transaction data without completing the transaction, and thereby restore the user's account and financial instruments to a previous state prior to loss of the transaction processing, which may be done if the transaction is marked as failed. Instead, by marking the transaction as transition pending, the service provider may proceed with electronic transaction processing using the cached data.

In certain embodiments, a pending transaction may also be moved to failed based on a lack of funds in the user's account. For example, the user may attempt to send $100 when the user does not have sufficient funds to cover the payment. However, using the transition mode similar to above, the pending transaction may be moved to a successful transaction by recovering funds in another account, investment, or other financial asset of the user, as discussed herein. The user's account may include or be linked to a stock brokerage account, where the funds may be provided by selling one or more financial investments to receive the amount. In this manner, the transaction may proceed even in the event of lack of direct funds. The user may establish preferences for this type of funding, which may be used to determine whether financial investments, security, or tool may be used to provide a payment for a potentially failed transaction, and which asset to use (e.g., an order of investment or asset sale to provide payment for a normally failed transaction due to lack of funds).

In order to proceed with electronic transaction processing, the service provider may calculate risk in proceeding with the transaction based on the transaction data and the failed device. The risk assessment or level may be determined for how risky the transaction is to complete based on the transaction data in the data cache, for example, based on incomplete or partial transaction data and/or without user approval and authorization to proceed with processing the transaction (e.g., when the user agrees to terms and/or selects an option to proceed with transaction process). A risk level may indicate the potential fraud in the transaction and whether there is fraud or risk of loss in proceeding with the transaction using the data in the cache for the transaction. Risk factors for the risk assessment or risk level may include amount of funds in the account for use in completing the transaction (e.g., if there are sufficient funds), a number of reversed or fraudulent past transactions including those during device failure, a length of account ownership or since opening, available payment instruments for the account, a number or amount of transactions, an amount of the transaction, a comparison of the amount to past transactions, a location of the transaction, a time of the transaction, participants in the transaction and whether there are past connections or transactions between the participants (e.g., if the user of the failed device and the target of the transaction are friends or family and known each other), or other factor that may indicate potential risk. If there is an unacceptable level of risk, such as if the risk level exceeds a threshold level or number, then the service provider may not proceed with the transaction and may mark the transaction as failed, thereby either deleting the transaction from the data cache or requiring the user's device to come back online and verify and authorize the transaction. Thus, transaction processing of a transaction having a failed device may only be available for certain transactions, such as certain purchases or transfers and/or between certain users or merchants. The risk level may also be calculated where there is not device failure and instead there is a lack of funds in the sending or payer user, where the lack of funds would normally move a transaction to failure when being processed. In such embodiments, a risk level for the transaction may be determined, and a risk in proceeding with the transaction by selling pledged shares or other assets that may be accessible and may be used to recover sufficient funds to complete the transaction. This may occur normally, or may occur in particular situations, such as a hospital where the user may lack funds for a payment or insurance (e.g., health care) card.

If there is no risk in the transaction or the risk is at an acceptable level (e.g., below a threshold amount), the service provider may generate a digital ledger based on the risk and the transaction data, where the digital ledger includes an amount from the user's account for the transaction that was in the transaction data. The risk assessment may also be used to determine whether to sell assets, investments, or other securities to recover funds sufficient to fund the digital ledger. The digital ledger may also be generated specifically for an identifier, device, or user identified in the transaction data, where authentication data and/or an identifier matching the transaction data may be required. The digital ledger may hold the funds for the transaction in the digital ledger for an amount of time. Thus, the digital ledger may act as a short term or temporary account that holds the funds in escrow for the other user or merchant identified in the transaction data. Using the identifier for the merchant/user in the transaction data, the merchant/user may be identified with a device corresponding to the merchant/user, and may be notified of the digital ledger having the held funds using the identifier.

The merchant/user may utilize a transaction processing application of the service provider to access the digital ledger and withdraw the funds. The merchant/user may withdraw the funds to complete the purchase or transfer, which may then be noted in the user's transaction history and stored with the account for later retrieval and viewing by the user using the device on reestablishment of functionality or on another device. Thus, the transaction may be completed using the digital ledger by providing the funds to the transaction payee or recipient in the transaction data. As previously discussed, the funds for the digital ledger may also be provided either in the form of stocks or other securities, linked or pledged shares of an investment, mutual funds, or other investments. The user may not have funds in their account that are currently available. Thus, the service provider may fund the digital ledger using other financial resources of the user, which may be based on a risk assessment, and may proceed to move the transaction to pending and/or completed by generating the digital ledger. Thus, the processed described herein to prevent a transaction from failing and moving the transaction to a transition or transition pending state using a digital ledger may also prevent transactions for an amount over what an account currently has in liquid assets from failing by using a risk assessment of transaction data to recover sufficient funds from pledged assets, investments, or other financial items.

The online service provider may provide account services to users of the online service provider, as well as other entities requesting additional services, which may be used to process electronic transactions during device failure or inoperability, as discussed herein. A user wishing to establish the account may first access the online service provider and request establishment of an account. The account may be established by providing account details, such as a login, password (or other authentication credential, such as a biometric fingerprint, retinal scan, etc.), and account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments, which may be used to provide funds for a digital ledger. In order to create an account, the user may be required to select an account name and/or provide authentication credentials, such as a password, personal identification number (PIN), answers to security questions, and/or other authentication information. Once an account is created, the account may be accessed through a web browser from a website of the service provider and/or a dedicated application of the service provider, such as a mobile smart phone application. A token may be issued to the device of the user for their respective personal account, where the token may include data (which may be encrypted) allowing the service provider to identify the user and their account and authenticate the user. Additionally, the online payment provider or other service provider may provide digital wallet services, which may offer financial services to send, store, and receive money, process financial instruments, and/or provide transaction histories. The application or website of the service provider, such as PayPal® or other online payment provider, may provide payments and the other transaction processing services.

Once the account is created, the user may utilize the account to conduct electronic transactions through a user computing device. However, as discussed above, this typically requires some sort of network connectivity between the user device and a computer server. In various embodiments, after detection of the condition affecting upcoming operation of the communication device, the communication device may allow for authentication on a nearby device to perform electronic transaction processing, or may request a nearby device process a transaction with a merchant or another user at the location using the funds provided in the digital ledger. In order to detect a nearby device, the communication device and/or service provider may utilize location data (e.g., through a GPS locator) for the communication device and other nearby devices. Such location data may be queried from the service provider or may be retrieved using one or more other processes, including communication with nearby devices. In other embodiments, short range wireless communications may be used to determine and query nearby (e.g., within communication range) devices for availability and location. Moreover, additional information may further be used to select one of a plurality of nearby devices to use, including relationships of users in possession of the communication device and the nearby device (e.g., friends or family that may know each other), device features and/or applications, device type, known or trusted users, security features, etc. Additionally, the nearby device may also be selected based on the applications available on the nearby device, which may include the application(s) required for use and completion of the transaction with another user or merchant using the funds in the digital ledger. The nearby device may be alerted of the request to authentication and may display data for the authentication request and/or the transaction or user requiring the authentication. Where the funds in the digital ledger are marked to complete another transaction at the location for the nearby device, the transaction processing application of the nearby device may be loaded with transaction information that allows the transaction to be processed as desired by the user having the failed or inoperable user device based on transaction data in the data cache. The user may be required to be authenticated on the nearby device using the authentication mechanism selected. The nearby device may process the request. Where the nearby device is used to complete a transaction when the user of the failed device is purchasing an item, the nearby device may load the application and provide an interface for the application having the data entered by the user to the purchase process on the failed device. The nearby device may thereby continue the processes of the communication device being performed by the communication device when it failed. The nearby device may also present other information allowing the other user to communicate with the user of the communication device, such as a contact number and time until failure of the communication device. Additionally, any data for the other user in the application may be protected from the user so that the other user's sensitive data is not shown to the user during use of the nearby device.

The user may also cancel the digital ledger and have the funds returned to the account of the user. The user may utilize another device to access the account of the user with the service provider, and may cancel the digital ledger through a request within an account management interface provided by the service provider. In various embodiments, if the digital ledger has been established but the funds have not been withdrawn, the funds may be automatically placed back in the account of the user. This may be done on expiration of a time period for validity of the digital ledger and/or for the transaction. The funds may also be placed back in the users account in response to receiving another transaction processing request that indicates the user is otherwise trying to process the transaction (e.g., using another payment instrument, such as a credit card) or the user has access to the account. The funds may be returned if the user's communication device is again detected as operable and in communication with the service provider. The user may be notified that the digital ledger is canceled and the funds were returned. Additionally, the transaction participant that acted as the payee or recipient may also be notified that the digital ledger is canceled and the funds are no longer available.

In this manner, the service provider may extend the communication device's functionality during time of non-operation by providing a redundancy mechanism that allows for continued electronic transaction processing when a device becomes inoperable. The service provider may therefore cover for times of device inoperability by triggering a mode that causes data caching to store transaction data remotely from the device, which insures that device inoperability does not compromise electronic transaction processing. Moreover, by utilizing a digital ledger or temporary account only based on a risk assessment, the service provider may further reduce fraud in electronic transaction processing and provide a reversible process that may be specifically configured to device and account needs during device inoperability.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a first communication device 110, a second communication device 120, and a service provider server 130 in communication over a network 150. A first user (not shown) may utilize first communication device 110 to request service provider server 130 execute and/or complete processes of first communication device 110 in the event of failure of first communication device 110. First communication device 110 may detect a condition of future non-operation and/or failure of first communication device 110, and determine electronic transaction processing data for a pending transaction being processed on first communication device 110 with second communication device 120. The transaction data may be transmitted to service provider server 130, for example, as a real-time data stream as the data is being input. Service provider server 130 may cache the data, and in the event of system failure may make a digital ledger for second communication device 120 if a risk assessment indicates that the transaction is not risky. Second communication device 120 may access the digital ledger and withdraw the funds from service provider server 130.

First communication device 110, second communication device 120, and service provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

First communication device 110 may be implemented as a communication device that may utilize appropriate hardware and software configured for wired and/or wireless communication with second communication device 120 and/or service provider server 130. For example, in one embodiment, first communication device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. First communication device 110 may correspond to and be utilized by a first user processing a transaction as a payer or sender of funds to a user or merchant associated with second communication device 120. In this regard, first communication device 110 may correspond to a failing device or a device predicted to fail or become non-operational with respect to a specific process being handled by the device, generally a device that may not be able to complete a current or predicted process or operation of an application for electronic transaction processing. Although a communication device is shown, the communication device may be managed or controlled by any suitable processing device. Although only one communication device is shown, a plurality of communication devices may function similarly.

First communication device 110 of FIG. 1 contains a transaction processing application 112, other applications 114, a database 116, and a communication module 118. Transaction processing application 112 and other applications 114 may correspond to executable processes, procedures, and/or applications with associated hardware. In other embodiments, first communication device 110 may include additional or different modules having specialized hardware and/or software as required.

Transaction processing application 112 may correspond to one or more processes to execute modules and associated devices of first communication device 110 to determine that first communication device 110 is failing, will become inoperable, or is in danger of failing or becoming inoperable during an electronic transaction processing operation or task with second communication device 120, and transmit data to service provider server 130 for use in completing the processing when first communication device 110 is no longer available for processing with service provider server 130. Where a condition indicating future non-operation or failure of the device is detected, transaction processing application 112 may provide the transaction data to service provider server 130 as the data is input to an interface prior to requesting electronic transaction processing, for example, by providing the data in real-time over a data stream. In this regard, transaction processing application 112 may correspond to specialized hardware and/or software utilized by first communication device 110 to first determine that first communication device 110 will fail or become in-operable, or is susceptible to failure or non-operation. Transaction processing application 112 may correspond to a general browser application configured to retrieve, present, and communicate information over the Internet (e.g., utilize resources on the World Wide Web) or a private network. For example, transaction processing application 112 may provide a web browser, which may send and receive information over network 150, including retrieving website information, presenting the website information to the user, and/or communicating information to the website. However, in other embodiments, transaction processing application 112 may include a dedicated application of service provider server 130 or other entity (e.g., payment provider, etc.), which may be configured to provide services through the application.

In this regard, an inoperable condition of first communication device 110 may be detected, where the condition indicates a likelihood that the first user of first communication device 110 will no longer be able to utilize first communication device 110 in the future (e.g., within a set time frame, such as the next minute, 5 minutes, etc., or within another parameter, such as 5% remaining battery, travel to a location with no signal, etc.). The condition may be one or more of low battery, no communication signal or low communication signal, structural or hardware damage, software damage or corruption (e.g., malware, a virus, etc.), a software update for the communication device that may affect the current application or processes executing on the communication device, a firmware update, a hardware update or replacement, other types of updates that may require the communication device to power off or restart, lack of memory storage, and/or an application corruption of an application executing on the communication device. The condition may be detected using the hardware, operating system, and other processes and applications of first communication device 110. For example, transaction processing application 112 may query one or more processes of first communication device 110 to detect the condition, or may utilize an application programming interface (API) of transaction processing application 112 to make system calls to various system resources to determine the condition. Once detected, transaction processing application 112 may alert the first user of first communication device 110, as well as, in various embodiments, service provider server 130, for example, by sending communications or signals indicating the condition of inoperability of communication device 110 to service provider server 130. Service provider server 130 may then activate a mode to provide electronic transaction processing redundancy and complete processing based on transaction risk when first communication device 110 fails, as discussed herein.

Transaction processing application 112 may therefore include processes used to perform electronic transaction processing with second communication device 110 for a payment or a transfer. During processing of a payment or transfer transaction, transaction processing application 112 may be utilized to select payment instrument(s) for use in providing payment for a purchase transaction, transfer, or other financial process. As discussed herein, transaction processing application 112 may utilize user financial information, such as a credit card, bank account, or other financial account, as a payment instrument when providing payment information. Additionally, transaction processing application 112 may utilize a digital wallet stored with an account with a payment provider, such as service provider server 130, as the payment instrument, for example, through accessing a digital wallet or account of a user with service provider server 130 through entry of authentication credentials and/or by providing a data token that allows for processing using the account.

Transaction processing application 112 may utilize a digital token for the payment account, digital wallet, and/or payment instruments by providing the digital token to authenticate the user and/or use the user's payment account, digital wallet, and/or payment instruments, which may be encrypted and/or provided through a secure channel, to a transaction participant to authenticate the account, digital wallet, and/or payment instruments to service provider server 130 and allow for transaction processing and payment using the account, digital wallet, and/or payment instruments. Selection of a payment instrument may occur prior to, at, or after establishment of the transaction. Transaction processing application 112 may also receive additional transaction data elements, including a recipient (e.g., an identifier associated with second communication device 110) and a transaction amount. Once entered, the transaction data may be provided to server provider server 130, such as in a real-time data stream based on the activated mode for an inoperable condition of first communication device 110. Transaction processing application 112 may be utilized to view the results of payment, for example, using transaction histories, dispute resolution processes, and other post-transaction process.

In various embodiments, transaction processing application 112 may be utilized to create an account used to process the transaction and establish the mode allowing for transition state processing of electronic transactions where first communication device 110 fails. In this regard, transaction processing application 112 may be used to enter one or more payment instruments or other funding sources for storage in a digital wallet associated with a payment account (e.g., stored and/or serviced by service provider server 130), access the digital wallet and/or payment account for use, and engage in transaction processing with another entity. Transaction processing application 112 may provide an interface to permit the user to enter input and other data for a transaction, for example, through an input device (e.g., touch screen with a graphical user interface, keypad/keyboard, mouse, etc.) and/or through a data capture device (e.g., scanner, camera, other optical device, etc.). Such information may be stored with service provider server 130 in a data cache for use with electronic transaction processing when first communication device 110 is inaccessible.

Transaction processing application 112 may determine processes currently in execution by first communication device 110 at or near the time or condition of failure/non-operation. For example, transaction processing application 112 may determine applications and application processes executing for a transaction. Once processes in execution (e.g., applications and application processes executing on first communication device 110) are detected, transaction processing application 112 may further determine any necessary process and/or application data, such as current data entered into the process, received data for the process, and user input data to the process. The process(es) and associated data may be stored to service provider server 130. In various embodiments, transaction processing application 112 may continue tracking the process(es) and updating the information for the process(es)/data up to the point of failure/non-operation of first communication device 110. Transaction processing application 112 may also be used to determine a nearby device to utilize for completing a transaction and/or entering authentication credentials necessary to complete transaction processing. In this regard, transaction processing application 112 may select second communication device 120 as the nearby device. Transaction processing application 112 may perform the selection based on received information for nearby devices from second communication device 120 and/or service provider server 130. In other embodiments, service provider server 130 may select a nearby device, such as second communication device 120, based on information received from first communication device 110 and/or second communication device 120. For example, second communication device 120 may be selected as the nearby device to utilize based on received geo-locations for first communication device 110 and/or second communication device 120 (e.g., GPS coordinates or locations, addresses or map locations, etc.). In other embodiments, first communication device 110 and second communication device 120 may detect each other and/or communicate for purposes of device selection and token transfer using short range wireless communications, such as Bluetooth, Bluetooth Low Energy, radio, infrared, WiFi, near field communications, LTE Direct, or other short range communication protocol.

In various embodiments, first communication device 110 includes other applications 114 as may be desired in particular embodiments to provide features to first communication device 110. For example, other applications 114 may include security applications for implementing client-side security features, programmatic client applications for interfacing with appropriate application programming interfaces (APIs) over network 150, or other types of applications. Other applications 114 may also include additional communication applications, such as email, texting, voice, and IM applications that allow a user to send and receive emails, calls, texts, and other notifications through network 150. In various embodiments, other applications 114 may include financial applications, such as banking, online payments, money transfer, or other applications. Other applications 114 may also include other location detection applications, such as a mapping, compass, and/or GPS application, which may be used to determine a location for the user that is communicated to payment provider server 130. Other applications may include social networking applications and/or merchant applications. Other applications 114 may include device interfaces and other display modules that may receive input and/or output information. For example, other applications 114 may contain software programs, executable by a processor, including a graphical user interface (GUI) configured to provide an interface to the user.

First communication device 110 may further include database 116 stored to a transitory and/or non-transitory memory of first communication device 110, which may store various applications and data and be utilized during execution of various modules of first communication device 110. Thus, database 116 may include, for example, identifiers (IDs) such as operating system registry entries, cookies associated with transaction processing application 112 and/or other applications 114, IDs associated with hardware of first communication device 110, or other appropriate IDs, such as IDs used for payment/user/device authentication or identification. Database 116 may include data for conditions of future non-operation/failure and/or process(es) and associated data executing on first communication device 110 at or nearby the conditions of failure for processing a transaction, which may be provided to service provider server 130 prior to and up to the point of failure.

First communication device 110 includes at least one communication module 118 adapted to communicate with second communication device 120 and/or service provider server 130. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Second communication device 120 may be implemented as a communication device that may utilize appropriate hardware and software configured for wired and/or wireless communication with first communication device 110 and/or service provider server 130. For example, in one embodiment, second communication device 120 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Second communication device 120 may correspond to and be utilized by a second user, such as a merchant or other payee/recipient of funds during electronic transaction processing. Although a communication device is shown, the communication device may be managed or controlled by any suitable processing device. Although only one communication device is shown, a plurality of communication devices may function similarly.

Second communication device 120 of FIG. 1 contains a transaction processing application 122, other applications 124, a database 126, and a communication module 138. Transaction processing application 122 and other applications 124 may correspond to executable processes, procedures, and/or applications with associated hardware. In other embodiments, second communication device 120 may include additional or different modules having specialized hardware and/or software as required.

Transaction processing application 122 may correspond to one or more processes to execute modules and associated devices of second communication device 120 to perform electronic transaction processing with first communication device 110 for a payment or a transfer transaction between users and/or merchants. In this regard, device leasing application 132 may correspond to specialized hardware and/or software utilized by second communication device 120 to process an electronic transaction, which may include electronic transaction processing during device failure of first communication device 110 where second communication device 120 is required to access a digital ledger or temporary account generated by service provider server 130 using cached transaction data to request a fund withdrawal. Transaction processing application 122 may be utilized to create an account used to perform transaction processing including withdrawal of fund. In this regard, transaction processing application 122 may be used to enter one or more payment instruments or other funding sources for storage in a digital wallet associated with an account (e.g., stored and/or serviced by service provider server 130), access the digital wallet and/or payment account for use, and engage in transaction processing with another entity. Transaction processing application 122 may provide an interface to permit the user to enter input and other data for transaction processing, access one or more transaction processing operations and/or interfaces with service provider server 130 if first communication device 110 fails, and request the withdrawal of an amount of funds in a digital ledger, for example, through an input device (e.g., touch screen with a graphical user interface, keypad/keyboard, mouse, etc.) and/or through a data capture device (e.g., scanner, camera, other optical device, etc.). Such processes may be available from service provider server 130 utilizing the interfaces of transaction processing application 122.

The account accessible through transaction processing application 122 may be used to initiate, receive, and/or process/complete transactions using services provided by service provider server 130. Once transaction data is received by service provider server 130, service provider server 130 may process the data and alert second communication device 120 of transaction processing results through transaction processing application 122. However, if communication device 110 fails, service provider server 130 may generate a digital ledger or temporary account having an amount available for the second user associated with second communication device 120 to withdraw or use, as discussed herein. Second communication device 120 may receive a notification of the available funds in the ledger/account, and may be provided with a process to withdraw the funds. Transaction processing application 122 may display the notification, and may accept input to request the withdrawal of the funds. The notification may also include terms of use of the funds, which may also request that transaction processing application 122 use the funds as a payment for a transaction or a transfer to the second user associated with second communication device 110. The notification may also include transaction processing instructions and transaction data for entry to another transaction processing operation by the second user with another user or merchant nearby first communication device 110 and second communication device 120 to allow for transaction processing with the other user/merchant when first communication device 110 is inoperable.

Transaction processing application 122 may provide information for a payment account and/or a digital wallet stored with the account to request the withdrawal of the funds and deposit the funds in the account/digital wallet. Service provider server 130 may require entry of authentication credentials and/or by providing a data token that allows for processing if the funds using the account of the second user/merchant associated with second communication device 110. Transaction processing application 122 may utilize a digital token for the payment account, digital wallet, and/or payment instruments by providing the digital token to authenticate the user and/or use the user's payment account, digital wallet, and/or payment instruments, which may be encrypted and/or provided through a secure channel, to service provider server 130 and allow for transaction processing using the account and/or digital wallet. Transaction processing application 122 may be utilized to view the results of payment, for example, using transaction histories, dispute resolution processes, and other post-transaction process. Transaction processing application 122 may also receive a notification if a digital ledger is canceled or the funds withdrawn by the first user associated with first communication device 110, for example, through an account access operation and ledger cancellation request.

In various embodiments, second communication device 120 includes other applications 124 as may be desired in particular embodiments to provide features to second communication device 120. For example, other applications 124 may include security applications for implementing client-side security features, programmatic client applications for interfacing with appropriate application programming interfaces (APIs) over network 150, or other types of applications. Other applications 124 may also include additional communication applications, such as email, texting, voice and IM applications that allow a user to send and receive emails, calls, texts, and other notifications through network 150. In various embodiments, other applications 124 may include financial applications, such as banking, online payments, money transfer, or other applications. Other applications 124 may also include other location detection applications, such as a mapping, compass, and/or GPS application, which may be used to determine a location for the user that is communicated to payment provider server 130. Other applications may include social networking applications and/or merchant applications. Other applications 124 may include device interfaces and other display modules that may receive input and/or output information. For example, other applications 124 may contain software programs, executable by a processor, including a graphical user interface (GUI) configured to provide an interface to the user.

Second communication device 120 may further include database 126 stored on a transitory and/or non-transitory memory of second communication device 120, which may store various applications and data and be utilized during execution of various modules of second communication device 120. Database 126 may include, for example, identifiers (IDs) such as operating system registry entries, cookies associated with transaction processing application 122 and/or other applications 124, IDs associated with hardware of second communication device 120, or other appropriate IDs, such as IDs used for payment/user/device authentication or identification. Database 126 may include a received notification of an available funded amount in an account for withdrawal by second communication device 120.

Second communication device 120 includes at least one communication module 138 adapted to communicate with first communication device 110 and/or service provider server 130. In various embodiments, communication module 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 130 may be maintained, for example, by an online service provider, which may provide leased device services for the first user associated with first communication device 110 and the second user associated with second communication device 120. In this regard, service provider server 130 includes one or more processing applications which may be configured to interact with first communication device 110, second communication device 120, and/or another device/server to facilitate leasing of devices. In one example, service provider server 130 may be provided by PAYPAL®, Inc. of San Jose, Calif., USA. However, in other embodiments, service provider server 130 may be maintained by or include a financial service provider, social networking service, email or messaging service, media sharing service, and/or other service provider, which may provide electronic processing services, for example, through the use of an application and/or account.

Service provider server 130 of FIG. 1 includes a device operations monitoring application 140, a transition account application 132, other applications 134, a database 136, and a network interface component 138. Device operations monitoring application 140, transition account application 132, and other applications 134 may correspond to executable processes, procedures, and/or applications with associated hardware. In other embodiments, service provider server 130 may include additional or different modules having specialized hardware and/or software as required.

Device operations monitoring application 140 may correspond to one or more processes to execute modules and associated specialized hardware of service provider server 130 to monitor first communication device 110 in the event of a predicted failure or other non-operation of first communication device 110 and determine whether a transition mode or other mode for a non-operational device may be required to be activated, as well as if first communication device 110 has become inoperable. Note that failure, non-operation, inoperability, or similar descriptions of the communication device generally refers to the communication device being unable to perform or complete an action or process currently being performed by the communication device at a future time and does not require the device to fail completely, which may include signal loss or unresponsive communications with first communication device 110. In this regard, device operations monitoring application 140 may correspond to specialized hardware and/or software to perform one or more of the processes described in references to transaction processing application 112 of first communication device 110 to receive signaling of an inoperable condition and determine if and when first communication device 110 has failed.

Device operations monitoring application 140 may be used for detection of a condition of future failure/non-operation of first communication device 110, determination of process data in use on first communication device 110 during electronic transaction processing, cache the data as pending transaction data, and detect if/when first communication device 110 has failed. On detection of the condition, such as through signaling received by first communication device 110, device operations monitoring application 140 may activate the mode to being caching the pending transaction data as the data is entered and received during transaction processing. If the transaction proceeds to completion without failure of first communication device 110, device operations monitoring application 140 may mark the transaction as complete and delete the data in the cache. However, if device operations monitoring application 140 detects that first communication device 110 has failed, device operations monitoring application 140 may utilize transition account application 132 to determine transaction risk in generating a transition account or ledger with funds from the users account and allow for withdrawal through second communication device 110.

Transition account application 132 may correspond to one or more processes to execute modules and associated specialized hardware of service provider server 130 to receive transaction data for a transaction having a failed device prior to authorization and approval of transaction processing, determine a risk of proceeding with the transaction through a transition mode and digital ledger having funds from the payer/sender's account in the transaction, and generate the digital ledger if the risk is below a threshold or at an acceptable level to proceed using the digital ledger. In this regard, transition account application 132 may correspond to specialized hardware and/or software to establish a digital ledger or temporary account in response to a determination that a risk level of proceeding with the transaction and creating the digital ledger is below a required threshold or at an acceptable level. The risk level may indicate potential fraud in the transaction data and with proceeding with the transaction, and may measure risk or loss associated with proceeding with the transaction. The risk level may therefore correspond to a fraud assessment determined using one or more of amount of funds in the account for use in completing the transaction (e.g., if there are sufficient funds), a number of reversed or fraudulent past transactions including those during device failure, a length of account ownership or since opening, available payment instruments for the account, a number or amount of transactions, an amount of the transaction, a comparison of the amount to past transactions, a location of the transaction, a time of the transaction, participants in the transaction and whether there are past connections or transactions between the participants (e.g., if the user of the failed device and the target of the transaction are friends or family and known each other), or other factor that may indicate potential risk.

Transition account application 132 may generate the digital ledger in response to calculating the risk if there is no risk or an acceptable level or risk. Transition account application 132 may generate the digital ledger and fund the ledger with an amount in the transaction data. The digital ledger may be made specifically available using an identifier for the transaction recipient/payee in the transaction data, which may also be used to send a notification to second communication device 120. Transition account application 132 may be used to provide a payment to the second user associated with second communication device 120, including payment for a previously pending transaction that did not proceed to approval and authorization based on failure of first communication device 110. Transition account application 132 may process the payment by making the funds available in the digital ledger for withdrawal and transmitting a notification to second communication device 120 that allows second communication device 120 to withdraw the funds. The digital ledger may be canceled by the first user through accessing an account and process with service provider server 130, or may be canceled after a certain amount of time or detecting that first communication device 110 is again operable. The digital ledger may be accessed and/or used through a browser application and/or dedicated payment application executed by first communication device 110. In order to authenticate an identity of the second user/merchant for use and withdrawal of funds in the digital ledger, transition account application 132 may authenticate the user for use of the account and/or identity through received identifiers for an account used to withdraw the funds. Transition account application 132 may debit an account of the first user and provide the payment to the digital ledger, which may be withdrawn an account of the second user/merchant. Transition account application 132 may also be used to provide transaction histories for processed transactions and withdrawals.

In various embodiments, service provider server 130 includes other applications 134 as may be desired in particular embodiments to provide features to payment provider server 150. For example, other applications 134 may include security applications for implementing server-side security features, programmatic client applications for interfacing with appropriate application programming interfaces (APIs) over network 150, or other types of applications. Other applications 134 may contain software programs, executable by a processor, including a graphical user interface (GUI), configured to provide an interface to the user when accessing payment provider server 134. In various embodiments where not provided by transition account application 132, other applications 134 may include connection and/or communication applications, which may be utilized to transmit communications to one or more devices.

Additionally, service provider server 130 includes database 136. Accounts in database 136 may include entity information, such as name, address, birthdate, payment/funding information, additional user financial information, and/or other desired user data. The entity may link to their respective accounts through an account, user, merchant, and/or device ID, as well as a generated token, which may be provided to second communication device 120 for use. Thus, when an ID is transmitted to service provider server 130, e.g., from first communication device 110, an account belonging to the entity may be found. Database 136 may also include or be associated with a data cache, which may be used to store transaction data based on a detected inoperable condition that activates an account mode to cache data in the event of device failure.

In various embodiments, service provider server 130 includes at least one network interface component 138 adapted to communicate with first communication device 110 and/or second communication device 120 over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
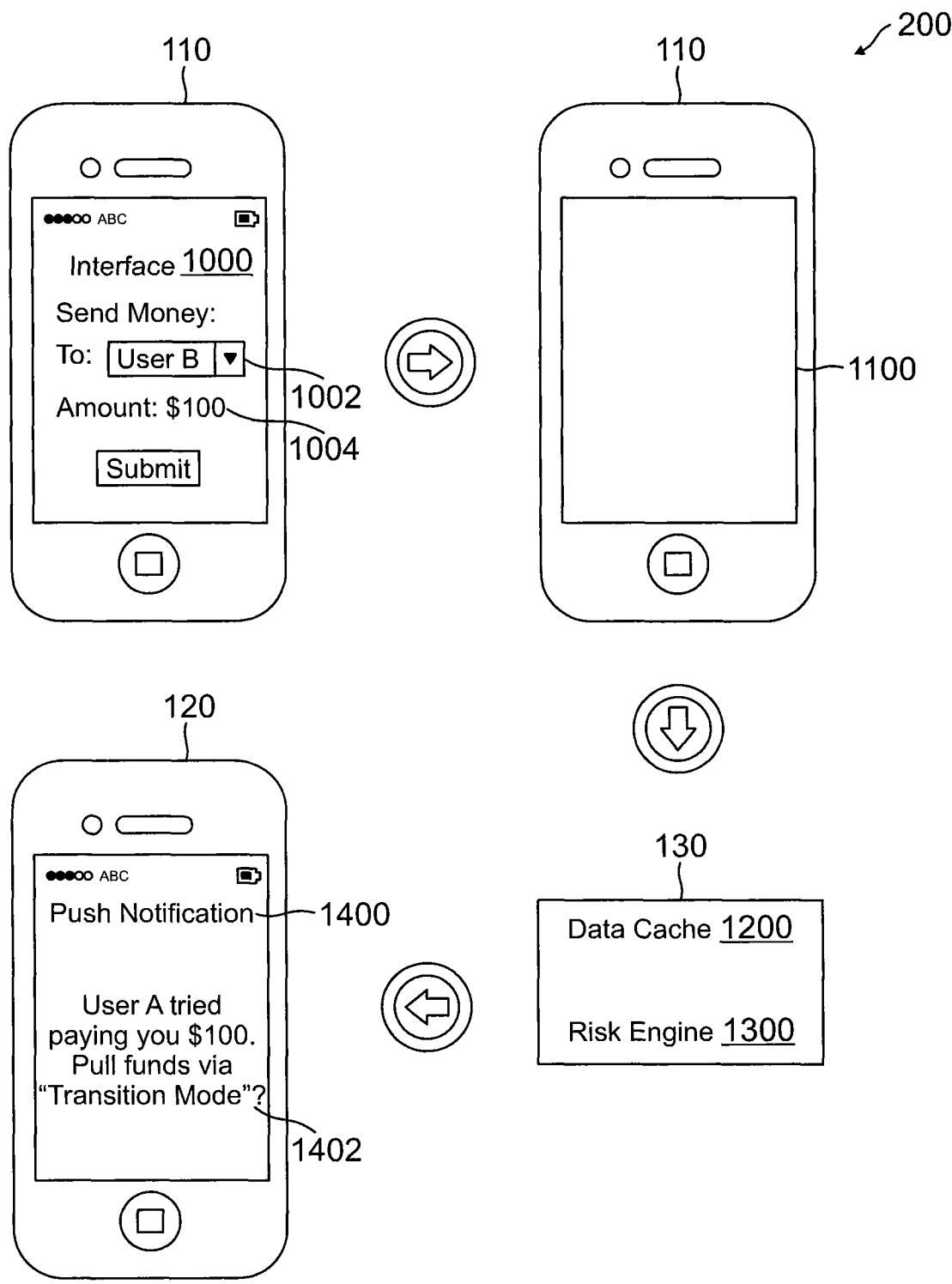
FIG. 2 is an exemplary environment displaying communication device interfaces prior to and after device inoperability to provide a network cache with transaction data, according to an embodiment.

FIG. 2 is an exemplary environment displaying communication device interfaces prior to and after device inoperability to provide a network cache with transaction data, according to an embodiment. Environment 200 of FIG. 2 includes an interface 1000 of first communication device 110 discussed in reference to system 100 of FIG. 1. In this regard, first communication device 110 may display one or more interfaces of a payer's or sender's device prior to failure after detecting a condition of future non-operation and after failure. Additionally, environment 200 includes second communication device 120 and a service provider server 130 discussed in reference to system 100 of FIG. 1.

Interface 1000 of environment 200 includes an interface form for entry of transaction data, shown as a recipient identifier 1002 and an amount 1004. First communication device 110 may detect a condition of future non-operation or failure, which may be caused by one or more hardware elements, software processes, and/or communication signals of first communication device 110. In response to this condition, first communication device 110 may send a signal to service provider server 130 of the condition and the potential for first communication device 110 to become non-operational prior to completing the transaction within interface 100. Recipient identifier 1002 and amount 1004 may be communicated to the service provider server 130 prior to device failure. In the event that the user using first communication device 110 is unable to select an option to authorize and complete electronic transaction processing for amount 1004 to recipient identifier 1002, service provider server 130 may use the data for recipient identifier 1002 and amount 1004 stored on a data cache to complete the transaction through generation of a digital ledger. For example, a payer user associated with first communication device 110 may attempt to remit or pay a payee user associated with second communication device 120. At least the payer may have a transition mode enabled for the payer's account and/or first communication device 110, which may also be required by the payee with second communication device 120 and the payee's account in certain embodiments. Thus, when first communication device 110 is at a low threshold, the transition mode may be enabled for first communication device 110.

As first communication device 110 proceeds to becoming inoperable, such as based on a lack of battery power, dead screen interface 1100 may not allow the user of first communication device 110 to request completion of the transaction for amount 1004 to recipient identifier 1002. Dead screen interface 1100 may correspond to an off output display, such as no current output data, that occurs in response to first communication device 110 becoming non-operational. For example, as the payer user attempts to hit send, first communication device 110 may turn off due to lack of power. Although dead screen interface 1100 is shown as blacked out, such as in a no-power state or due to device damage/software corruption, first communication device 110 may also be unable to process the transaction based on a lack of communication signals, where interface 1000 may still be displayed but network processing may be unable to be completed due to the lack of network signaling. Service provider server 130 may then use data cache 1200 to process stored transaction data. Transaction data in data cache 1200 may be processed using a risk engine 1300, which may be used to determine whether to proceed with generating a digital ledger based on a risk of potential fraud in completing the transaction using the transaction data without approval by the user on first communication device 110. The risk may be based on account and transaction factors for the transaction data in data cache 1200. For example, the risk assessment may determine that the transaction failed but due to a non-risk reason, namely that first communication device 110 failed for probable lack of battery power.

If service provider server 130 determines that the risk level is acceptable to proceed with the transaction using the transaction data in data cache 1200 with risk engine 1300, service provider server 130 may generate a digital ledger for recipient identifier 1002 having funds for amount 1004 in the digital ledger that may be withdrawn by the recipient for recipient identifier 1002. Service provider server 130 may use the determination that the transaction failed for non-risk reasons to trigger a notification to second communication device 120 of the available funds in a temporary digital ledger or account, and that the payee user is required to withdraw in the next 24 hours or other time period established for the digital ledger. Service provider server 130 may at the same time generate the digital ledger and move funds from the payer's account to the digital ledger.

In this regard, second communication device 120 may receive a push notification 1400 for the digital ledger, which alerts the recipient of a message 1402 indicating the digital ledger is available and the recipient may pull the funds. The notification may be triggered due to the risk assessment that determined the transaction failed for a non-risk reason. Second communication device 120 may also receive other notification data, including in-application messages, text messages, email, or other data. The notification may alert the payee of the time to withdraw the funds, and may allow the funds to be released to the payee's account. Second communication device 120 may also not receive a notification, and may only be allowed to navigate to an interface to view the digital ledger and withdraw the funds if the payee user associated with second communication device 120 knows of the transaction and is informed by the other payer user associated with first communication device 110 informs the user of the potential for funds to be held in a digital ledger. Second communication device 120 may also require the transition mode to be enabled for the payee's account and/or second communication device 120 to receive a notification or alert of the digital ledger and funds, as well as provide access to the digital ledger and allow withdrawal. Second communication device may receive an alert or notification of pending funds, which may also be populated as a message (e.g., email, text, etc.), a badge or application icon notification, an in-application message or push notification, or other data. Second communication device 120 may then be used for a process to withdraw the funds.

Figure 3:
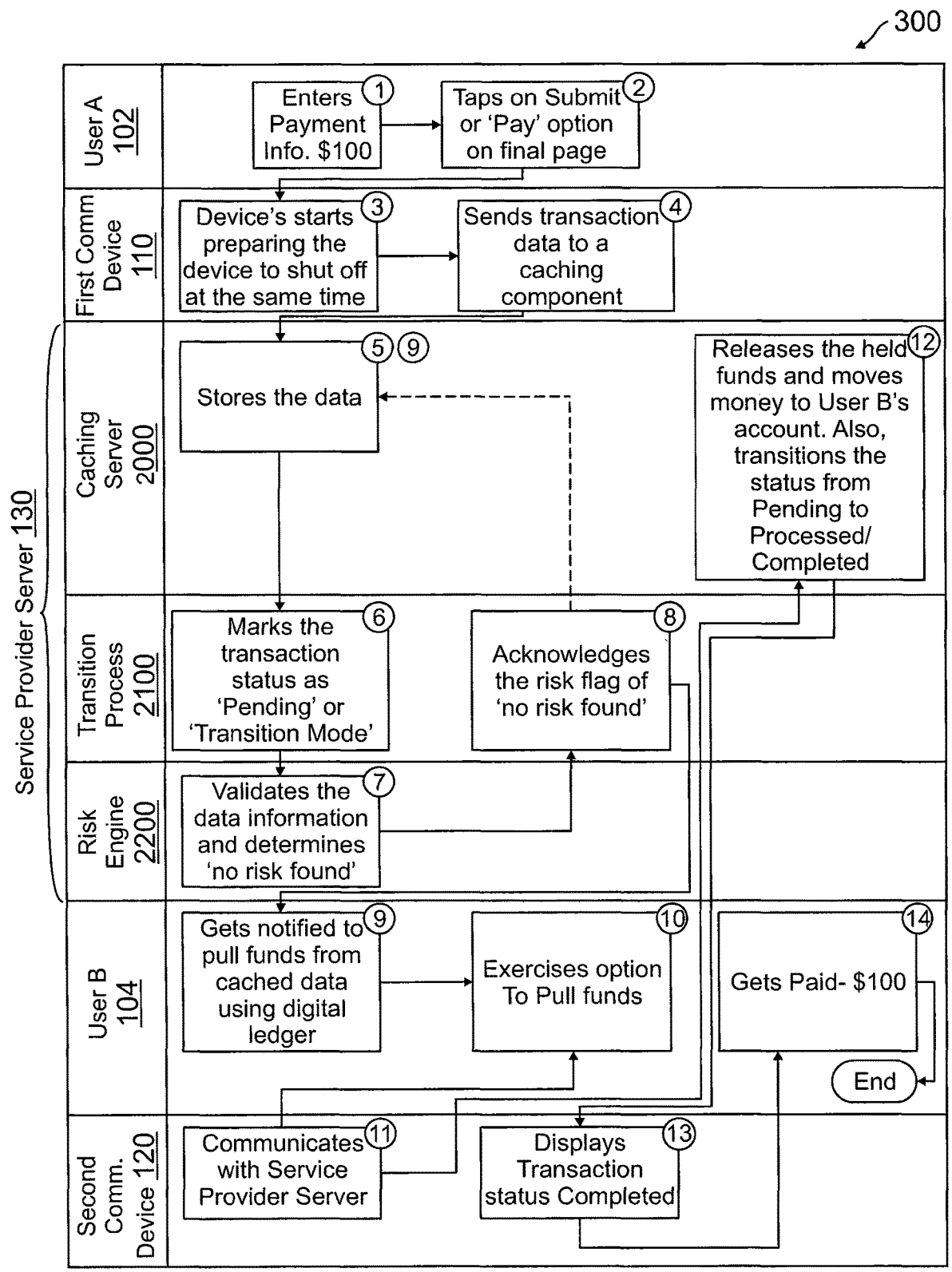
FIG. 3 is an exemplary system environment for communication device and server provider processes to generate a network cache and digital ledger to complete electronic transaction processing in the event of device failure, according to an embodiment.

FIG. 3 is an exemplary system environment for communication device and server provider processes to generate a network cache and digital ledger to complete electronic transaction processing in the event of device failure, according to an embodiment. Environment 300 of FIG. 3 includes a first communication device 110, a second communication device 120, and a service provider server 130 corresponding generally to the described devices and associated features found in system 100 of FIG. 1.

In environment 300, first communication device 110, second communication device 110, and service provider server may execute modules and processes described in reference to FIG. 1. In this regard, first communication device 110 is utilized by a user A 102, where user A 102 begins the process by entering payment information at step 1, where the payment information corresponds to "$100." User A 102 may also enter an identifier for a user B 104 and/or second communication device 120 that is the recipient of the funds in the transaction. At step 2, user A 102 may then use first communication device 110 to tap on a "submit" or a "pay" option on a final page or interface for a transaction processing request. This may occur at a time X. First communication device 110 may begin to prepare to shut off at the same time X due to an issue with operations or device resources, such as a low battery condition, at step 3. Due to this condition and prior to user A 102 being able to complete the transaction and submit the transaction data for approval, such as by tapping on submit, the issue causing inoperability of first communication device 110 may cause shutdown. Thus, at step 4, the transaction data is transmitted to a caching component of service provider server 130.

Service provider server 130 includes a caching server 2000, a transition process 2100, and a risk engine 2200. At step 5, caching server 2000 of service provider server 1300 receives the transaction data prior to completion of the transaction process, and stores the data. A cyclical process may be executed at steps 6-9 where the stored transaction data is continuously monitored for risk to determine whether transition process 2100 for a transition mode may use a digital ledger during the failure of first communication device 100 to finish transaction processing. At step 6, transition process 2100 marks the data in caching server 2000 as "pending" or in a transition mode.

Risk engine 2200 may then be executed at step 7 using the data to validate the transaction data in caching server 2000 and determine whether any or an acceptable level of risk is present. Risk assessment may proceed by utilizing risk factors present in the transaction, such as an account balance, time of transaction request, previous fraud assessments and/or fraud determinations (e.g., fraudulent transactions) by one or more parties in the transaction, location of transaction, relationship between user A 102 and user B 104, and other data. The risk assessment may calculate a risk level, amount, or other quantifier based on these factors. If the risk assessment is below a threshold level such that the transaction is deemed to be "not risky" or does not have apparent risk, then the transaction mat proceed. Thus, at step 8, if no or an acceptable level of risk is found, then the transaction data in caching server 2000 may continue to be stored and may be made available to transition process 2100 to provide an amount in the transaction data to a digital ledger available for the identifier in the transaction data. However, if risk or an unacceptable level of risk is found, the data may be taken out of the cyclical process and may be dropped from caching server 2000 and marked as failed for a transaction.

Based on the failure of first communication device 110, transition process 2100 may make funds available in a digital ledger if no risk or an acceptable level of risk is found at step 8, and at step 9 may notify user B 104 of the available funds to pull from the cached data using the digital ledger. Second communication device 120 is utilized by user B 104 to view the digital ledger and withdraw funds at step 10 by exercising the option to pull the funds. Second communication device 120 may then communicate with service provider server 130 to process the transaction to pull the funds from the digital ledger at step 11, which may include requesting the funds to be withdrawn from the digital ledger and placed in an account of user B 104. At step 11, additional authentication may also be performed on second communication device 120, including authentication of user B 104 for withdrawal of funds and use of a deposit account. In certain embodiments where user A 102 may be performing an in-store payment to user B 104, the authentication may also be performed for user A 102 to authenticate and identify user A 102 on second communication device 110. At step 12, caching server 2000 may release the held funds and may move the money to user B 104's account. The transaction may also be transitioned from "pending" to "processed" or "completed" at step 12. Second communication device 120 may then display the results of transaction processing as a completed transition at step 13, and user B 104 may be paid the $100 at step 14.

Figure 4:
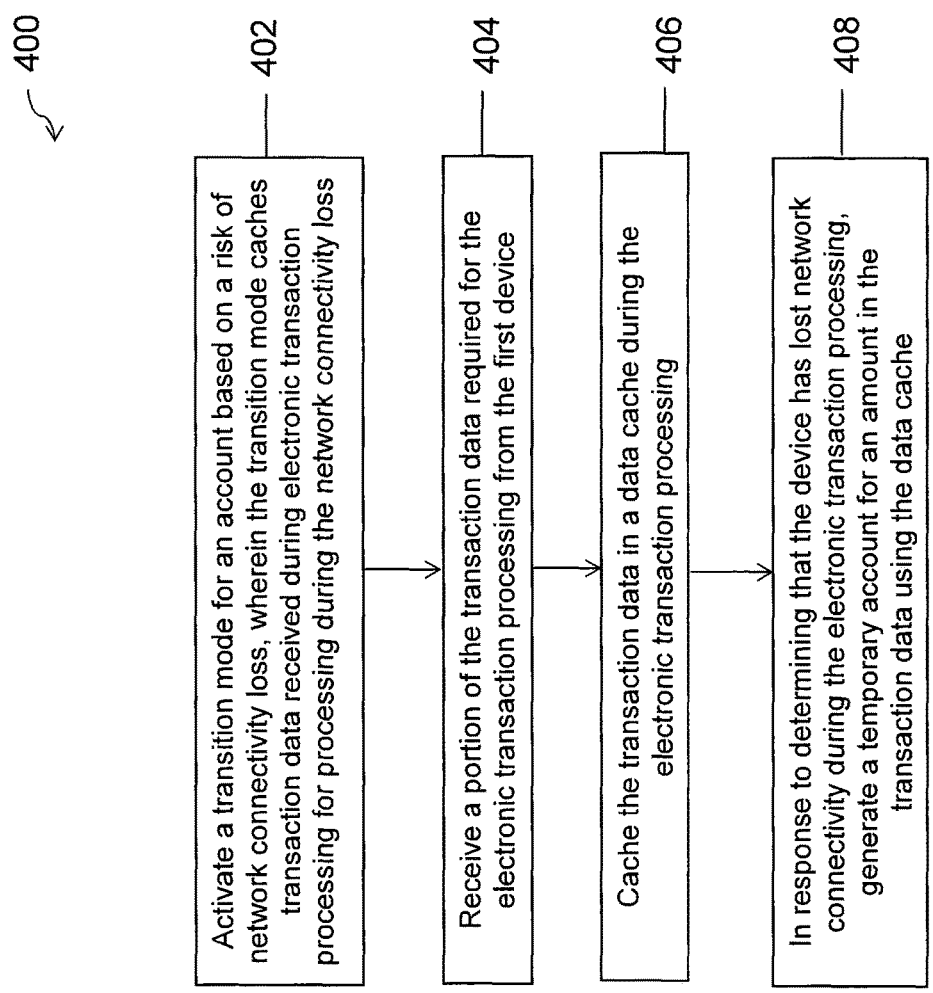
FIG. 4 is an exemplary process flowchart for a network cache of device input for redundancy during device inoperability, according to an embodiment.

FIG. 4 is an exemplary process flowchart for a network cache of device input for redundancy during device inoperability, according to an embodiment. Note that one or more steps, processes, and methods described herein may be omitted, performed in a different sequence, or combined as desired or appropriate.

At step 402 of flowchart 400, a transition mode for an account is activated based on a risk level of the network connectivity loss, wherein the transition mode caches transaction data received prior to electronic transaction processing during the network connectivity loss. Prior to activating the transition mode, the risk level of network connectivity loss for a first device of a first user using the account may be determined based on current data for the first device. The account may also be determined using an identifier for the device. Determining the risk level of network connectivity loss may comprise determining that the first device is not or will not be operational based on communications sent and/or received from the first device, such as one of receiving a first communication that the first device will not be operational that is communicated prior to the first device becoming non-operational or sent communications that determine that the first device is not responsive to the sent communications transmitted to the first device.

A portion of the transaction data required for the electronic transaction processing may be received from the first device, at step 404 of flowchart 400. At step 406 of flowchart 400, the transaction data may be cached in a data cache during the electronic transaction processing through the transition mode. Caching the data may be performed in response to a process request in the transition mode to cache the transaction data or any other incomplete transaction processing request based on the power state of the first device being below the predetermined power level, and wherein the transaction data is stored with a predicted time of the device power loss. When caching the data, risk assessment may also be executed on the transaction data. For example, the transaction data may include a first geo-location of the first device, where it may be determined that a second geo-location for the second device in the transaction data is within a first proximity range of the first geo-location associated with a risk assessment factor. The transaction data may also further comprise at least one of a face identification, a fingerprint, an account authentication credential, a transaction geo-location, or a transaction time. The transaction data may also only be cached based on a risk assessment process performed on the transaction data. The risk assessment process may use at least one of available funds in the account used by the first device, a past transaction by the account, a geo-location of the first device, a time of the inoperable condition or other data that causes the risk of network connectivity loss, or a social connection between the first user for the first device and the second user for the second device when determining whether the transaction data indicates potential fraud in use of the amount in the transaction data.

At step 408 of flowchart 400, in response to determining that the first device has lost network connectivity during the electronic transaction processing, a temporary account for an amount in the transaction data is generated using the data cache. The amount in the temporary account may only be valid for a certain amount of time, after which a remaining amount of the amount may be transferred back to the user's account from the temporary account. Determining that the first device has lost network connectivity may comprise one of receiving a first signal that the first device will shut down, receiving a second signal that the first device will lose battery power, or determining that the first device is unresponsive through a third signal to the first device. The temporary account may correspond to a digital ledger established for a transaction associated with the transaction data, where the amount is added to the digital ledger using the account. A notification of the amount available in the temporary account/ledger may be communicated to a second user through an identifier in the transaction data, and in response to receiving a request to withdraw the amount from the account/ledger and deposit the amount to a second account of the second user, the transaction amount may be transferred to the second account. Moreover, when the request for a withdrawal of the amount from the temporary account or digital ledger is received, identification data may be requested. In response to processing the withdrawal, the identification data for the withdrawal may be stored with the account/ledger or in the account of the user. An authentication credential may also be requested, which may be required to be authenticated for the second user prior to the transfer.

After generating the temporary account, a login request to the account through a second device may be received, as well as a cancellation request of the temporary account. The amount may be provided back to the account. In other embodiments where the temporary account is not canceled, a second device of a second user may be communicated with to perform a transaction with a third device using the amount in the temporary account, wherein the third device is identified in the transaction data. The transaction with the third device may be processed using the temporary account, for example, in response to receiving a transaction processing request from the second device. A first geo-location of the first device may be determined using the transaction data, and it may be determined that a second geo-location for the second device matches the first geo-location, wherein the first user provides authentication credentials for the transaction on the second device. Moreover, prior to communicating with the second device, social contacts of the first user may be accessed and it may be determined that the second user is a known contact of the first user using the social contacts.

As such, electronic transaction conducted through mobile computing devices may be completed even when the computing device initiating or currently processing the transaction becomes inoperable, such as due to power failure, network connectivity, or software/hardware issues within the computing device.

Figure 5:
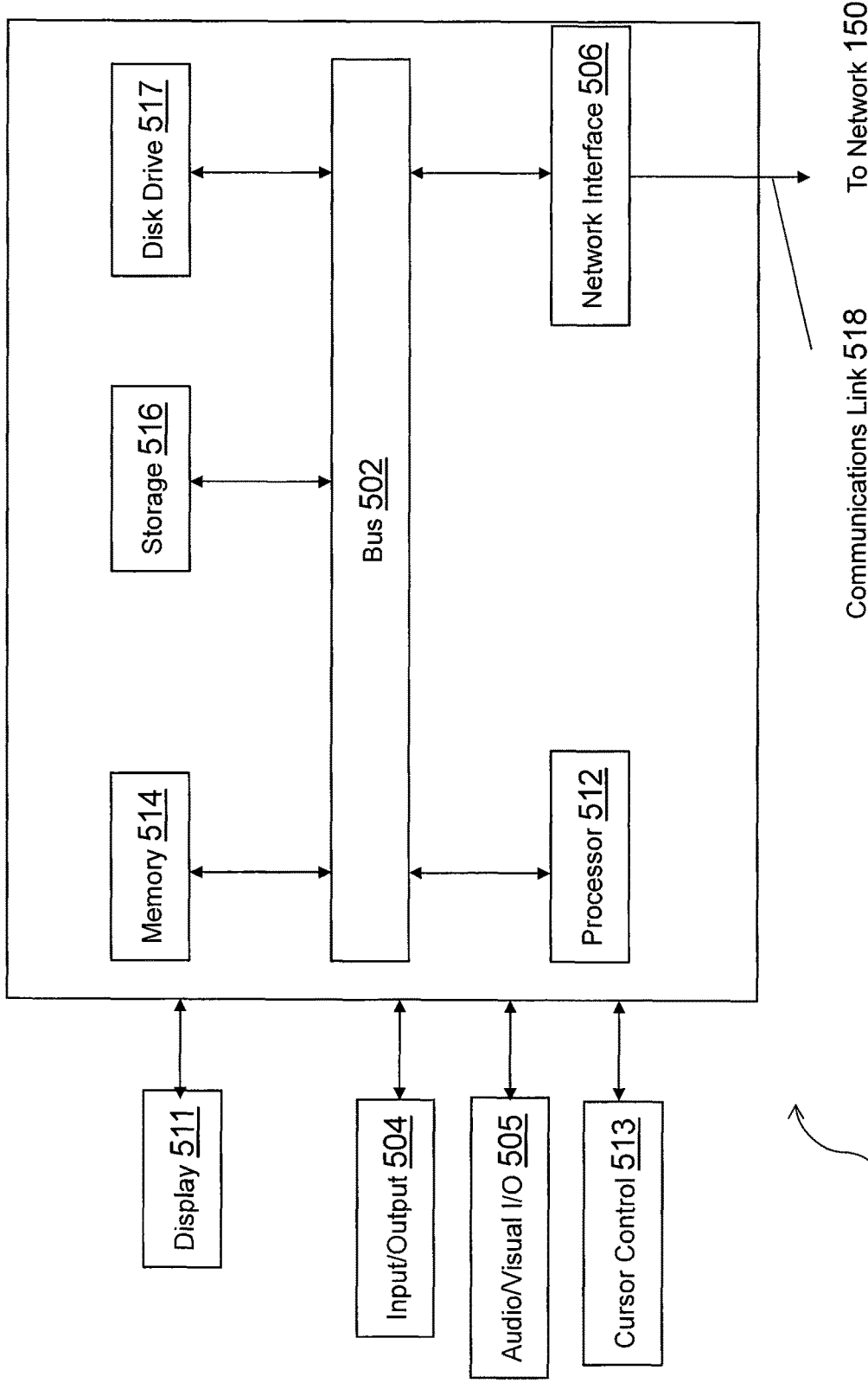
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider system comprising:
   a network interface component configured to communicate with a first communication device of a first user, wherein the network interface component is further configured to track device operational data for the first communication device;
   a non-transitory memory storing account data for a plurality of accounts including a first account, wherein the account data for the first account includes a non-operational device mode for use with the first account; and
   one or more hardware processors configured to execute instructions to cause the service provider system to perform operations comprising:
      receiving a signal associated with an inoperable condition of the first communication device;
      determining the device operational data for the first communication device based on receiving the signal, wherein the device operational data comprises the inoperable condition and a first identifier associated with the first account;

determining, using the first identifier, the first account associated with the first communication device;

automatically triggering the non-operational device mode for the first account based on the inoperable condition;

receiving, from the first communication device, transaction data corresponding to a transaction using the first account of the first user;

in response to receiving the transaction data from the first communication device, determining a transaction amount for the transaction using a partial amount of the transaction data, wherein the partial amount is included in the transaction data; and establishing a digital ledger comprising the transaction amount based on the non-operational device mode, wherein the transaction amount is added to the digital ledger using the first account.

2. The service provider system of claim 1, wherein the transaction data comprises a second identifier for a second communication device of a second user, and wherein the operations further comprise:

communicating, to the second communication device, a notification of the transaction amount available to the second user in the digital ledger; and in response to receiving a request to withdraw the transaction amount from the digital ledger and deposit the transaction amount to a second account of the second user, transferring the transaction amount to the second account.

3. The service provider system of claim 2, wherein prior to transferring the transaction amount to the second account, the operations further comprise:

requesting an authentication credential for the second user from the second communication device; and authenticating the second user based on a received input for the authentication credential, wherein the transaction amount is transferred based on the authenticating.

4. The service provider system of claim 2, wherein the transaction data further comprises a first geo-location of the first communication device, and wherein the establishing the digital ledger further comprises:

determining a second geo-location of the second communication device; and determining that the second geo-location is within a first proximity range of the first geo-location associated with a risk assessment factor, wherein the digital ledger is established with the transaction amount based on the determining that the second geo-location is within the first proximity range of the first geo-location.

5. The service provider system of claim 2, wherein the transaction data further comprises at least one of a face identification, a fingerprint, an account authentication credential, a transaction geo-location, or a transaction time.

6. The service provider system of claim 2, wherein prior to determining the transaction amount, the operations further comprise:

executing a risk assessment process on the transaction data, wherein the risk assessment processes determines whether the transaction data indicates potential fraud in use of the digital ledger; and caching the transaction data based on the executing the risk assessment process.

7. The service provider system of claim 6, wherein the risk assessment process uses at least one of available funds in the first account, a past transaction by the first account, a geo-location of the first communication device, a time of the inoperable condition, or a social connection between the first user and the second user when determining whether the transaction data indicates potential fraud in use of the digital ledger.

8. The service provider system of claim 2, wherein the operations further comprise:

requesting an authentication credential of the first user through the second communication device, wherein the digital ledger is established in response to receiving the authentication credential and authenticating the first user.

9. The service provider system of claim 1, wherein prior to establishing the digital ledger, the operations further comprise:

determining that the first communication device is not operational based on communications with the first communication device, wherein the digital ledger is established in response to the determining that the first communication device is not operational.

10. The service provider system of claim 9, wherein the determining that the first communication device is not operational based on the communications comprises one of receiving a first communication that the first communication device will not be operational that is communicated prior to the first communication device becoming non-operational or determining that the first communication device is not responsive to the communications through a second communication transmitted to the first communication device.

11. The service provider system of claim 1, wherein the transaction amount is valid for withdrawal from the digital ledger by a second user for a period of time, and wherein the operations further comprise:

in response to expiration of the period of time, reverting a remaining amount of the transaction amount to the first account from the digital ledger.

12. A method comprising:

receiving, via a network interface component configured to communicate with a first communication device of a first user, wherein the network interface component is further configured to track device operational data for the first communication device, a signal associated with an inoperable condition of the first communication device;

determining the device operational data for the first communication device based on receiving the signal, wherein the device operational data comprises the inoperable condition and a first identifier associated with a first account;

determining, using the first identifier, the first account associated with the first communication device based on account data for a plurality of accounts including the first account, wherein the account data for the first account includes a non-operational device mode for use with the first account;

automatically triggering the non-operational device mode for the first account based on the inoperable condition;

receiving, from the first communication device, transaction data corresponding to a transaction using the first account of the first user;

in response to receiving the transaction data from the first communication device, determining a transaction amount for the transaction using a partial amount of the transaction data, wherein the partial amount is included in the transaction data; and establishing a digital ledger comprising the transaction amount based on the non-operational device mode, wherein the transaction amount is added to the digital ledger using the first account.

13. The method of claim 12, wherein the determining the device operational data comprising the inoperable condition comprises an indication that the first communication device will shut down based on an operation of the first communication device.

14. The method of claim 13, wherein the determining the device operational data comprising the inoperable condition comprises an indication that the first communication device will lose battery power at one of a time or an amount of battery power.

15. The method of claim 13, wherein the determining the device operational data comprising the inoperable condition comprises an indication that the first communication device is unresponsive based on a network communication transmitted to the first communication device.

16. The method of claim 13, further comprising:
receiving a login request to the first account through a second communication device; and
in response to receiving a cancellation request of the digital ledger, providing the transaction amount back to the first account.

17. The method of claim 16, further comprising:
accessing contacts of the first user; and
determining that the second communication device is a known contact of the first user using the contacts,
wherein the providing the transaction amount back to the first account is in response to the determining that the second communication device is the known contact.

* * * * *